(12) United States Patent
Hughes et al.

(10) Patent No.: US 7,948,921 B1
(45) Date of Patent: May 24, 2011

(54) AUTOMATIC NETWORK OPTIMIZATION

(75) Inventors: David Anthony Hughes, Los Altos Hills, CA (US); Balaji Balasubramanian, San Jose, CA (US)

(73) Assignee: Silver Peak Systems, Inc., Santa Clara, CA (US)

( * ) Notice: Subject to any disclaimer, the term of this patent is extended or adjusted under 35 U.S.C. 154(b) by 399 days.

(21) Appl. No.: 11/903,416

(22) Filed: Sep. 20, 2007

(51) Int. Cl.
*H04L 12/28* (2006.01)
*H04L 12/56* (2006.01)

(52) U.S. Cl. .................. 370/255; 370/392; 370/401

(58) Field of Classification Search .................. 370/254, 370/255, 389, 392, 400, 401
See application file for complete search history.

(56) References Cited

U.S. PATENT DOCUMENTS

| | | | |
|---|---|---|---|
| 6,295,541 B1 | 9/2001 | Bodnar | |
| 6,618,397 B1 * | 9/2003 | Huang | 370/474 |
| 7,120,666 B2 | 5/2004 | McCanne | |
| 7,007,044 B1 | 2/2006 | Rafert | |
| 7,113,962 B1 | 9/2006 | Kee | |
| 7,215,667 B1 * | 5/2007 | Davis | 370/389 |
| 7,266,645 B2 | 9/2007 | Garg | |
| 7,388,844 B1 * | 6/2008 | Brown et al. | 370/252 |
| 2002/0163911 A1 * | 11/2002 | Wee et al. | 370/389 |
| 2003/0233431 A1 | 12/2003 | Reddy | |
| 2004/0243571 A1 | 12/2004 | Judd | |
| 2006/0143497 A1 | 6/2006 | Zohar | |
| 2007/0258468 A1 * | 11/2007 | Bennett | 370/400 |

OTHER PUBLICATIONS

Muthitacharden, Athicha et al., "A Low-Bandwidth Network File System," 2001, in Proc. Of the 18th ACM Symposium on Operating Systems Principles, Banff, Canada, pp. 174-187.

* cited by examiner

*Primary Examiner* — Hong Cho
(74) *Attorney, Agent, or Firm* — Carr & Ferrell LLP (57) ABSTRACT

Systems and methods for automatic network optimization are provided. One embodiment comprises receiving a first data packet including an unenhanced payload from a first network device. A portion of the first data packet is then modified, the portion being outside the unenhanced payload of the first data packet, to indicate that a first optimization device is capable of enhanced communication. Next, the modified first data packet is sent from the first optimization device to an endpoint device. An indication of a capability of enhanced payload processing may be received. Based on the indication, an enhanced payload of a second data packet addressed to the endpoint device based on the indication may be generated. Finally, the second data packet including the enhanced payload may be sent to the endpoint device.

23 Claims, 9 Drawing Sheets

AUTOMATIC NETWORK OPTIMIZATION

CROSS-REFERENCES

This U.S. nonprovisional application is related to U.S. nonprovisional application Ser. No. 11/202,697 filed Aug. 12, 2005 and entitled "Network Memory Architecture," which is hereby incorporated herein by reference.

BACKGROUND

1. Field of Invention

This invention relates generally to computer networking and more specifically to automatic network optimization.

2. Description of the Related Art

Generally, network devices such as servers, computers, and routers communicate data with one another in a communication network. If large amounts of data are sent via the communication network, communications can take considerable time to transmit and/or be received. Further, it may be necessary to encrypt sensitive data before transmission over the communication network.

To allow the network devices to communicate more efficiently and/or securely, data may be compressed and/or encrypted prior to being sent from one network device to another via the communication network. However, the network device receiving the data must be capable of decompressing and/or decrypting the data. In instances where the data is compressed, the network device receiving the compressed data requires the ability to decompress the data. Likewise, in instances where the data is encrypted, the network device receiving the encrypted data requires an ability to decrypt the data.

In typical communication networks, the network devices are not identically equipped to encrypt, decrypt, compress, and/or decompress data. Thus, a network device transmitting data must either track or otherwise identify which network devices are capable of performing various compression and/or encryption mechanisms prior to the transmission of data.

Currently, this information may be stored on a device-by-device basis as a set of heuristics such as "if sending data to device A, encrypt data using encryption mechanism B." However, this method is not efficient in a communication network connecting a very large number of network devices and in networks where the network devices may spontaneously connect or disconnect from the communication network. Further, this method may only be effective when all network devices are within a tightly controlled network whereby each device is previously identified and specifically configured to receive the encrypted or decompressed transmitted data.

In some communication networks, the devices may communicate encryption and/or compression capabilities by sending queries to other devices in the communication network for their respective capabilities. These queries are included in a payload of, for example, an Internet Protocol (IP) data packet. To process the queries, the sending device and the receiving device both require an additional software client even if the receiving device has no capabilities. Furthermore, the queries and responses contribute to the amount of network traffic and further slow down communication between the network devices.

SUMMARY

A method for processing an enhanced payload is provided. The method comprises receiving a first data packet including an unenhanced payload from a first network device. A portion of the first data packet is modified to indicate that a first optimization device is capable of enhanced communication. The portion is outside the unenhanced payload of the first data packet. The modified first data packet is sent from the first optimization device to an endpoint device. An indication of a capability of enhanced payload processing is received. An enhanced payload of a second data packet addressed to the endpoint device is generated based on the indication. Finally, the second data packet including the enhanced payload is sent to the endpoint device.

In some embodiments, receiving the indication comprises receiving a third data packet from a second optimization device over a tunnel. The indication may comprise receiving a third packet including another enhanced payload. The modified portion may include a checksum, a hash value, or a sequence number. The modified portion may be included in a Transmission Control Protocol option, an Internet Protocol option, or an Internet Protocol header. The enhanced payload of the second data packet may be compressed, encrypted, or comprise a retrieval instruction.

The method may further comprise sending the first data packet from the first optimization device to the endpoint device via at least two optimization devices. In some embodiments, the method comprises sending a third data packet from the first optimization device to an endpoint device, the third data packet having a modified portion outside of a payload, receiving an acknowledgement of the third data packet that does not indicate a capability of enhanced payload processing, receiving a fourth data packet with an unenhanced payload, and sending the fourth data packet to the endpoint device.

A method for processing a modified data packet comprises receiving a first data packet. A portion of the data packet outside of a payload is analyzed. A modification that indicates that the modified data packet was received via an optimization device is identified and an indication of a capability to process an enhanced payload is sent to the optimization device.

A system for automatic network optimization comprises a first optimization device and a second optimization device. The first optimization device may receive a data packet from an endpoint device, modify a portion of the data packet outside of a payload to indicate that the first optimization device is capable of enhanced processing, and send the modified first data packet via a communication network. The second optimization device is on the communication network and may receive the modified data packet, detect the modification, and indicate to the first optimization device that the second optimization device is capable of the enhanced processing.

An optimization device comprises a modification module and an identification module. The modification module may receive a first data packet from a network device and modify a portion of the first data packet outside of a payload of the first data packet, the modification indicating an enhanced processing capability. The identification module may receive a second modified data packet from an optimization device, detect the modification in a portion of the second data packet, and send an indication of the enhanced processing capability to the optimization device.

DETAILED DESCRIPTION

Systems and methods for providing automatic network optimization are disclosed. Automatic network optimization is a mechanism within a communication network whereby networked devices can communicate an indication of a capability to process an enhanced payload without modifying the data contained in a payload of a data packet. The networked devices may comprise, for example, servers, computers, routers, network memory appliances, or the like.

A data packet comprises a header and a payload. The header includes information such as source address, destination address, total length, type of service, and the like. The payload typically includes data to be processed by the receiving network device. An enhanced payload is a payload that has been modified such that it can be processed by another device capable of processing the enhanced payload. Network devices capable of processing the enhanced payload are referred to as "optimization devices." Examples of enhanced payloads include compressed payloads, encrypted payloads, and/or payloads comprising a retrieval instruction.

In a communication network, each of the network devices may have enhanced payload processing capabilities. In one example, a transmitting device may simply generate an enhanced payload for each data packet transmitted without first determining whether the network device receiving the data packet having the enhanced payload is capable of processing the enhanced payload.

In other communication networks, however, not all network devices are configured to process enhanced payloads (i.e., be optimization devices). In these communication networks, it is desirable to transmit data packets having an enhanced payload to network devices that can process the enhanced payloads and to transmit data packets having an unenhanced payload to network devices that are not configured to process enhanced data packets. An unenhanced payload comprises a payload that can be processed by virtually any device on the network. Examples of unenhanced payloads include unencrypted and/or uncompressed payloads. In these hybrid communication networks, it is therefore desirable to automatically determine which devices on the communication network are capable of enhanced payload processing to optimize network performance.

In some embodiments, an optimization device that transmits a data packet may modify data outside of the payload of the data packet to determine if the receiving device is capable of enhanced payload processing. The modification may be included in the Internet Protocol (IP) header, the options within the IP header, a Transmission Control Protocol (TCP) header, or the like. The modification may indicate that the optimization device is capable of transmitting, receiving, and/or otherwise processing enhanced payloads. The payload of the data packet comprising the modification may be an unenhanced payload.

If another optimization device receives the data packet comprising the modification, the receiving optimization device identifies the modification in the header data of the data packet and responds to the transmitting optimization device to indicate that the receiving optimization device can process an enhanced payload. The response may comprise a data packet comprising an enhanced payload, a data packet sent via a tunnel between the transmitting optimization device and the receiving optimization device, or the like. The data packets subsequently communicated between the two optimization devices may include an enhanced payload.

If a third network device that is not capable of processing an enhanced payload receives the modified packet, the third network device may not identify the modification and will process the unenhanced payload. In one example, a device that is incapable of enhanced payload processing may receive the modified packet and process the payload of the packet normally without identifying any modification.

Figure 1:
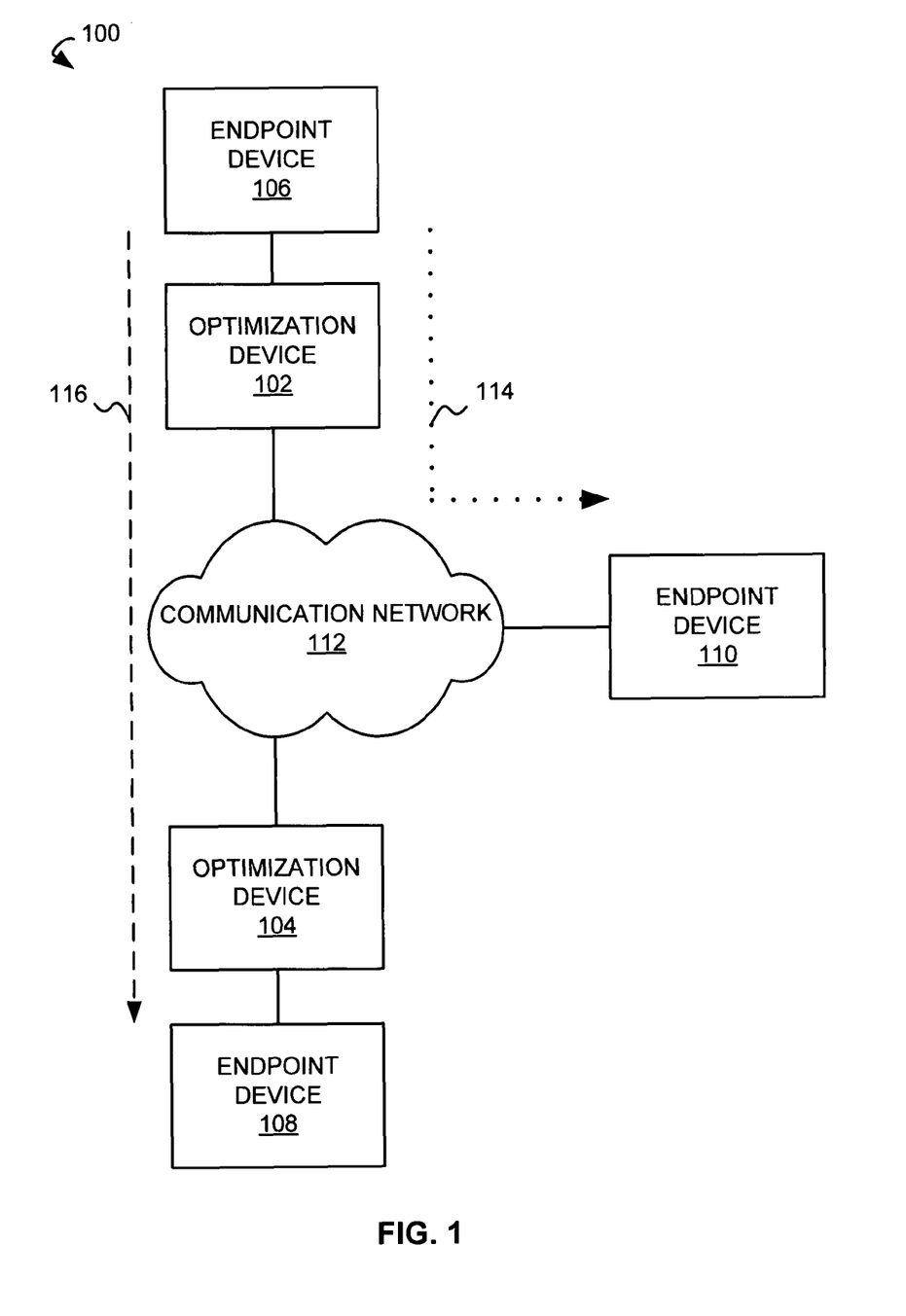
FIG. 1 depicts a diagram of an exemplary network environment in which various embodiments may be performed.

FIG. 1 depicts a diagram of an exemplary network environment 100 in which various embodiments may be performed. The network environment 100 comprises two optimization devices 102 and 104 as well as three endpoint devices 106, 108, and 110 configured to communication via the communication network 112. The endpoint devices 106 and 108 are configured to communicate with other network devices via the optimization devices 102 and 104, respectively. The endpoint device 110 is not associated with an optimization device.

The endpoint devices 106, 108, and/or 110 may comprise computers, servers, or the like. In one example, the endpoint device 106 may transmit a data packet to another network device via the optimization device 102. The optimization device 102 may receive the data packet, modify the data packet to indicate that the optimization device can process an enhanced payload, and forward the data packet to another network device (e.g., endpoint device 108). The optimization device 102 may be configured to receive an indication from the other receiving network device indicating that the receiving network device is also capable of processing an enhanced payload.

According to some embodiments, the optimization device 102 may comprise a separate network device such as a network memory appliance. A network memory appliance is further described herein. Further, network memory appliances are discussed in U.S. nonprovisional application is related to U.S. nonprovisional application Ser. No. 11/202,697 filed Aug. 12, 2005 and entitled "Network Memory Architecture," which is hereby incorporated herein by reference. In other embodiments, the functionality of the optimization device may be included in a software, firmware, and/or hardware module within the endpoint device 106 as will be apparent to those skilled in the art.

The endpoint device 108 may comprise, for example, a computer, a server, or the like. The endpoint device 108, as described above with respect to the endpoint device 106, may communicate with at least one other endpoint device via the optimization device 104. The optimization device 104 receives a modified data packet (e.g., from the optimization device 102), and identifies a modification. If no modification is identified, the optimization device 104 may forward the data packet to the endpoint device 108. If a modification is identified, the optimization device 104 may forward the data packet to the endpoint device 108 and additionally send an indication to the optimization device 102 that the modification has been identified and/or that the optimization device 104 is capable of enhanced payload processing.

The optimization device 104 may subsequently receive a data packet including the enhanced payload. In some embodiments, the optimization device 104 may decompress, decrypt, and/or process one or more retrieval instructions such that the payload can be processed by the endpoint device 108.

A first communication pathway 114 from the endpoint device 106 to the endpoint device 110 depicts the pathway of a data packet from a network device (e.g., endpoint device 106) associated with an optimization device (e.g., optimization device 102) to a network device (e.g., endpoint device 110) not associated with an optimization device. In these embodiments, the endpoint device 106 generates the data packet including an unenhanced payload and transmits the data packet to the endpoint device 110. The optimization device 102 may intercept and modify the data packet outside of the payload to indicate the presence of the optimization device 102. The optimization device 102 then forwards the modified data packet to the endpoint device 110 which processes the unenhanced payload without identifying the modification.

A second communication pathway 116 from the endpoint device 106 to the endpoint device 108 depicts the pathway of a data packet between two endpoint devices that are each associated with an optimization device (i.e., optimization device 102 and optimization device 104, respectively). The endpoint device 106 generates a data packet including an unenhanced payload addressed to the endpoint device 108. The data packet is received by the optimization device 102 which determines whether the endpoint device 108 or the optimization device 104 associated with the endpoint device 108 can process an enhanced payload.

In one example, the optimization device 102 modifies the data packet outside of the payload to indicate the presence of the optimization device 102. The optimization device 102 then forwards the modified data packet to the endpoint device 108. The optimization device 104 receives the modified data packet and determines that the data packet was transmitted from the optimization device 102. Subsequently, the optimization device 104 may indicate to the optimization device 102 that the optimization device 104 is capable of enhanced payload processing. Upon identifying a receiving device capable of enhanced payload processing, the optimization device 102 generates an enhanced payload of a subsequent data packet received from the endpoint device 106 to forward to the endpoint device 108. The optimization device 102 transmits the data packet including the enhanced payload to the endpoint device 108.

The optimization device 104 may receive the data packet comprising the enhanced payload, and process the enhanced payload to re-create the unenhanced payload generated by endpoint device 106. The optimization device 104 then transmits a data packet including the unenhanced payload to the endpoint device 108.

The optimization device 102 may transmit modified data packets to any number of other network devices. In various embodiments, the optimization device 102 modifies data packets in such a way as to not be noticeable to a receiving device (e.g., endpoint device 110) that is not capable of enhanced payload processing.

In one example, the optimization device 102 may transmit multiple data flows including modified data packets to a plurality of network devices wherein the network devices include those network devices capable of enhanced payload processing and those network devices that are not capable of enhanced payload processing. The network devices capable of enhanced payload processing may identify the modification within the modified data packet and indicate the capability to the optimization device 102. The optimization device 102 may then enhance the payload of data packets being transmitted to the network devices capable of enhanced payload processing. However, a network device that is not capable of enhanced payload processing may ignore or otherwise not detect the modification within the data packet. As a result, the network device may not indicate a capability of enhanced network processing and may simply process the payload within the modified data packet.

Figure 2:
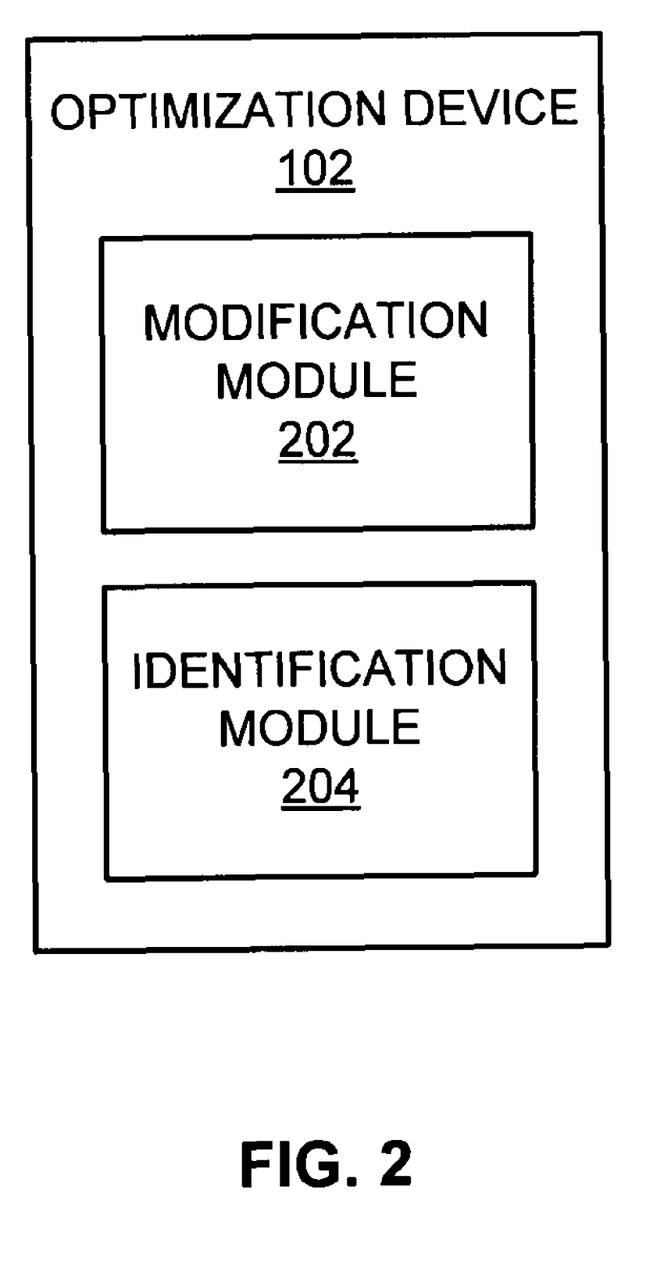
FIG. 2 depicts block diagram of an exemplary optimization device according to various embodiments.

FIG. 2 depicts block diagram of an exemplary optimization device 102 according to various embodiments. The optimization device 102 may at least communicate the capability to process an enhanced payload. In some embodiments, the optimization device 102 may additionally be configured to generate an enhanced payload from an unenhanced payload and vice-versa. The optimization device 102 comprises a modification module 202 and an identification module 204. The modification module 202 and the identification module 204 may be implemented as hardware, software, and/or firmware.

The modification module 202 may receive a data packet from a source endpoint device (e.g., endpoint device 106) and transmit a data packet addressed to a destination endpoint device (e.g., endpoint device 108). The modification module 202 may determine whether the destination endpoint device or an optimization device associated with the destination endpoint device can process an enhanced payload. If the determination can not be made and/or there is no indication of a capability to process an enhanced payload at the destination endpoint device, the modification module 202 may modify a portion of the data packet outside of the payload to indicate that the optimization device 102 is capable of processing an enhanced payload.

The identification module 204, conversely, may receive a data packet from another optimization device (e.g., optimization device 102). The identification module 204 identifies the modification and transmits an indication to the optimization device from which the data packet was received. The indication may comprise a data packet including an enhanced payload and/or a communication sent via a tunnel between the optimization devices.

In exemplary embodiments, the modified data packet is the first data packet (or the first set of data packets) of a flow of data transmitted from an optimization device to an endpoint. The payload of the data packet contains data belonging to the flow and not data querying whether the receiving device is capable of enhanced payload processing. As a result, an endpoint that is not capable of enhanced payload processing may receive and process all of the data within a flow even if every data packet of the flow is modified (e.g., the header or a portion of the header of each data packet is modified). In one example, the data within the header is modified such that an endpoint that is not capable of enhanced payload processing may not detect or otherwise notice the modification.

Figure 3:
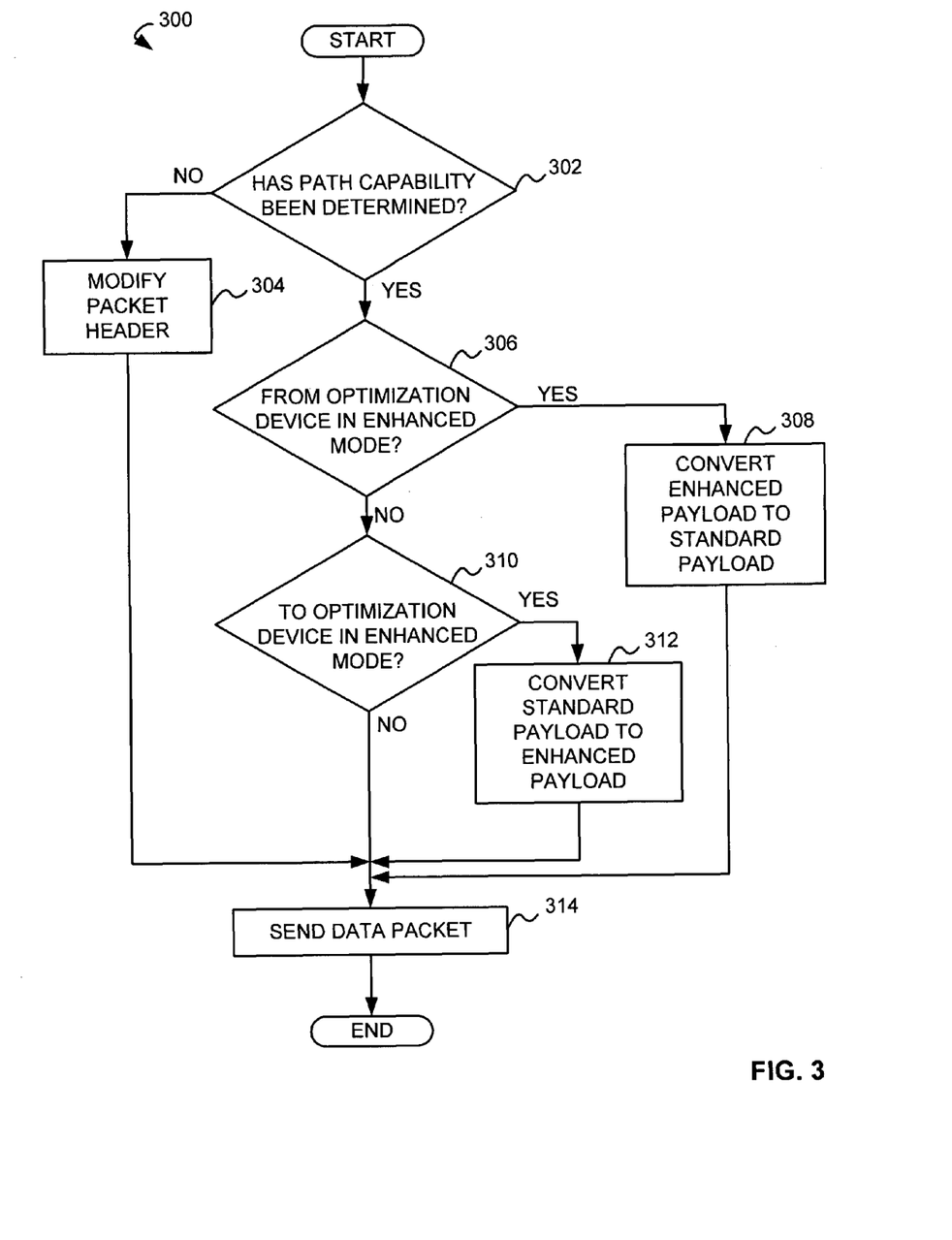
FIG. 3 depicts a flowchart of an exemplary process for determining contents of a data packet prior to transmission.

FIG. 3 depicts a flowchart of an exemplary process 300 for determining contents of a data packet prior to transmission. The process 300 may be performed by the optimization device 102 upon receipt of a data packet from an endpoint device such as endpoint device 106 or another optimization device such as optimization device 104. The process 300 can be performed to determine whether to insert a modification into the packet header, convert a standard (i.e., unenhanced)

payload into an enhanced payload, or convert an enhanced payload into a standard payload.

In step 302, a determination is made as to whether the path capability has been determined (i.e., is known). The path may be determined based on address fields in an IP header. For each path, if an optimization device has received an indication from another optimization device of a capability to process an enhanced payload, the path capability has been determined. The other optimization device may be associated with an endpoint device identified by a destination IP address included in the packet header. In another example, the path capability may be based on a table which identifies the receiving device as having received one or more enhanced payloads in the past.

In an embodiment, the determination in step 302 is performed on a flow-by-flow basis. For example, the path capability may be determined at the beginning of each flow. Once the path capability of a flow is known, each data packet belonging to the flow is enhanced or not enhanced based on the determination. The determination in step 302 may be based on a previously determined path capability of another flow or may be re-established as described herein, at least, in connection with FIG. 1. A flow within the path may be identified using the address fields and a protocol field in an IP header and, in some instances, the source port number and destination port number in the TCP header or UDP header.

In step 304, if the path capability has not been determined or is not known, the packet header is modified. In some examples, the modification may be included in a TCP header, an IP header, or a UDP header. The modification can be identified by another optimization device and signifies that the source endpoint device which generated the data packet is associated with an optimization device.

If, however, the path capability has been determined, a determination is made as to whether the data packet was received from another optimization device operating in enhanced mode (i.e., whether the payload is an enhanced payload) in step 306.

If the data packet is received from the other optimization device operating in an enhanced mode, the enhanced payload is converted to a standard payload in step 308. In these instances, the data packet including the enhanced payload is addressed to an endpoint device associated with the optimization device (e.g., endpoint device 108 is associated with optimization device 104). Thus, in these embodiments, the optimization device decrypts, decompresses the enhanced payload, and/or executes any retrieval instructions in the enhanced payload.

If the data packet is to be communicated via an optimization device operating in the enhanced mode, the standard payload is converted into an enhanced payload in step 312. The step 312 may include compressing the standard payload, encrypting the standard payload, and/or generating one or more retrieval instructions based on the standard payload.

In step 314, the data packet, whether it is modified or converted, is sent to its destination. It should be understood that the process 300 may be altered in instances where a data packet is communicated via a tandem optimization device as will be described in greater detail in connection with FIGS. 5A and 5B.

In various embodiments, once a transmitting optimization device identifies an endpoint (or another optimization device) as being capable of enhanced payload processing, the transmitting optimization device can identify and/or track the endpoint (or other optimization device) (e.g., within a table). In one example, once a specific IP address is identified as being capable of receiving an enhanced payload, the transmitting optimization device may enhance other data packets (either within the same flow or other flows) that identify the specific IP address without transmitting one or more modified data packets.

In some embodiments, the transmitting optimization device may confirm the capability of the specific IP address to receive enhanced data packets. In one example, the transmitting optimization device may transmit a modified data packet addressed to the specific IP address at the beginning of a data flow (or over a predetermined period of time). Those skilled in the art will appreciate that there are many ways to store, track, confirm, and otherwise identify endpoints (and/or optimization devices) capable of enhanced data processing.

Figure 4:
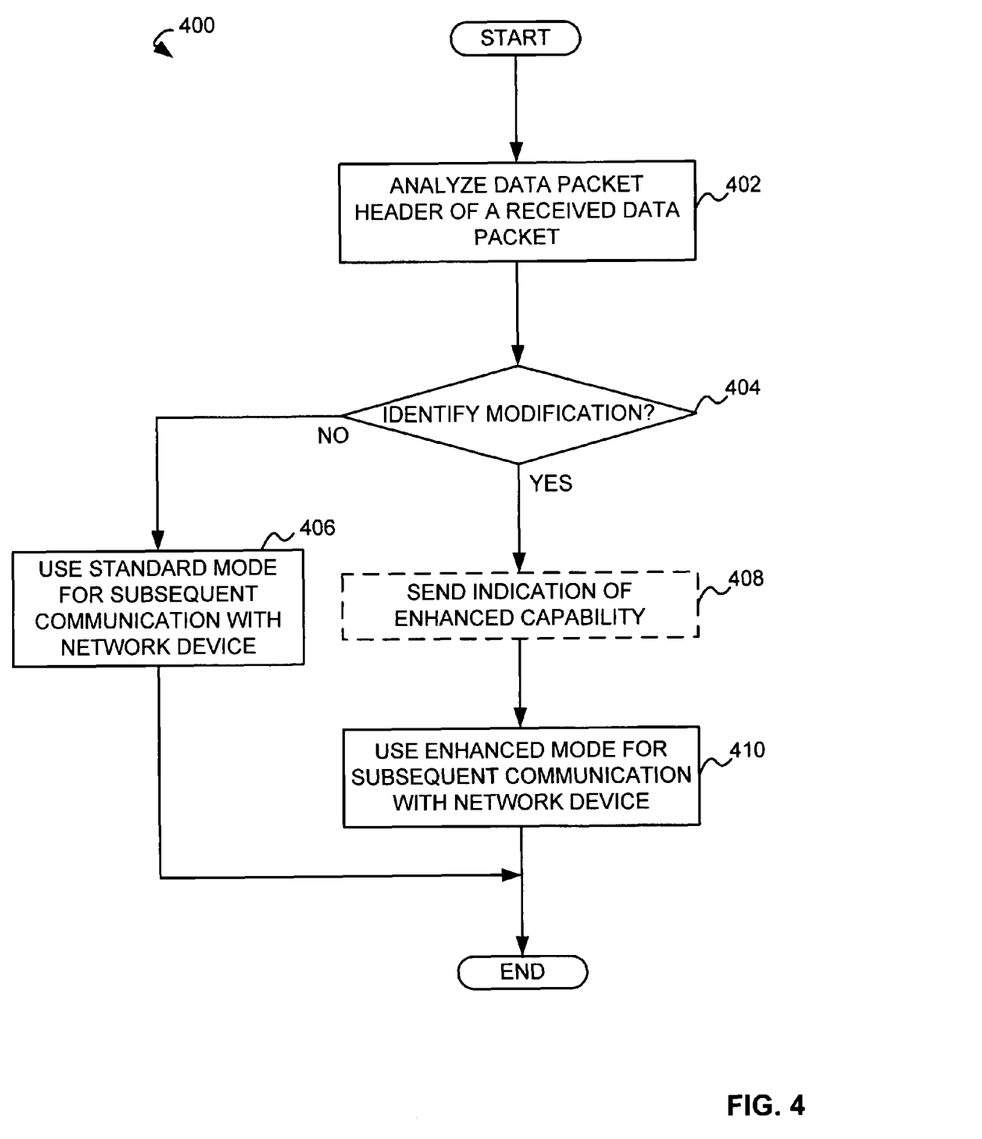
FIG. 4 depicts a flowchart of an exemplary process for responding to a device having enhanced payload capability.

FIG. 4 depicts a flowchart of an exemplary process 400 for responding to a device having enhanced payload capability. The exemplary process may be performed by the optimization device 104.

In step 402, a header of a received data packet is analyzed. The header may include an IP header, a TCP header, and/or a UDP header. The IP header may include IP options.

In step 404, a determination is made as to whether a modification has been identified in the header data. In some embodiments, the modification may be identified over a series of packets. For example, the modification may comprise a 32 bit message sent over a series of four packets.

In some embodiments, the process 400 may also be performed to determine that packets received from a source IP no longer contain a modification. In these embodiments, if the modification is no longer being identified, the optimization device may assume that the source is no longer capable of processing an enhanced payload.

In step 406, if the modification is not identified, a standard mode is used for subsequent communication with the network device. The standard mode comprises sending a data packet that does not have an enhanced payload (e.g., the data packet is sent to an endpoint without enhanced payload processing). In some embodiments, the data packets, in standard mode, may include the modification to indicate that the source IP address is associated with a capability to process an enhanced payload.

In step 408, if the modification is identified, an indication of enhanced capability may be sent to another optimization device. The indication may comprise sending a data packet including an enhanced payload to the other optimization device. In some embodiments, a data packet may be sent in response to the other optimization device via a tunnel by embedding the data packet inside of another data packet to simulate a physical connection between two communication networks across a third communication network.

In step 410, the enhanced mode is used for subsequent communication with the network device. The enhanced mode may be used to communicate between two or more optimization devices. The data packets received from the network device may include an enhanced payload.

Figure 5A:
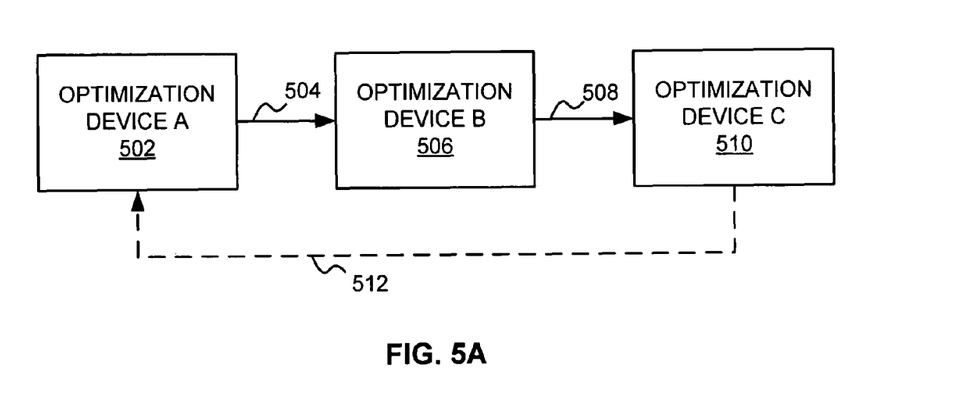
FIG. 5A depicts a diagram of a first response pathway according to various embodiments.

FIG. 5A depicts a diagram of a first response pathway according to various embodiments. In these embodiments, one or more optimization devices may be operated in tandem. For example, as depicted, an optimization device A 502 may transmit a modified data packet along path 504 to an optimization device B 506. The optimization device B 506 may re-transmit the modified data packet to the optimization device C 510 along path 508.

In order to determine whether a destination is associated with an optimization device C 510 and is therefore capable of processing an enhanced payload from the optimization device A 502, the optimization device B 506 may relay the modified data packet without further modifying the data packet. As discussed herein, the optimization device C 510 receives the modified data packet and identifies the modification, and sends an indication to the optimization device A 502 based on the source IP address in the header of the modified data packet. The respective IP addresses of the optimization device A 502 and the optimization device C 510 can be used to determine whether there is an existing tunnel or to establish a tunnel 512 between the two optimization devices. Subsequent data packets having an enhanced payload may be transmitted via the tunnel 512.

In one example, the optimization device B 506 identifies the modification in the modified, data packet that indicates that the transmitter (i.e., optimization device A 502) is capable of transmitting data packets with enhanced payloads. The optimization device B 506 may forward the modified data packet to the optimization device C 510. Optimization device C 510 may detect the modified portion of the modified data packet and identify optimization device A 502 as the transmitting device. As a result, the optimization device C 510 can communicate with optimization device A 502 without going through the optimization device B 506 (e.g., by establishing a tunnel with the optimization device A 502).

Figure 5B:
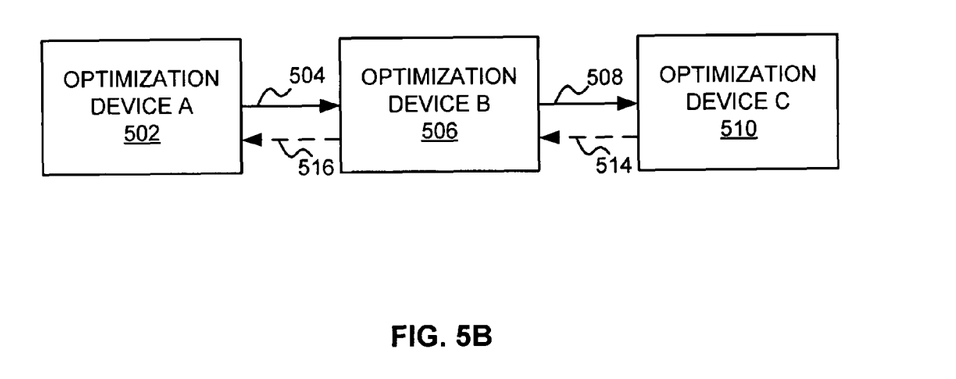
FIG. 5B depicts a diagram of a second response pathway according to various embodiments.

FIG. 5B depicts a diagram of a second response pathway according to various embodiments. In contrast to the embodiment depicted in FIG. 5A, the optimization device B 506 may operate in tandem with the optimization device A 502 and optimization device C 510 within the communication network 112. The tandem may overwrite the header data in a data packet received from the optimization device A 502 to replace the identification, such as the IP address, of the optimization device A 502 with the identification of the optimization device B 506. Thus, when the optimization device B 506 transmits the data packet to the optimization device C 510, the data appears to be forwarded from the optimization device B 506.

In some embodiments, the optimization device B 506 appends its identification to the header while retaining the identification of the optimization device A 502. In these embodiments, the optimization device C, upon receiving the data packet, may determine whether to communicate directly with the optimization device A 502 or via the optimization device B 506.

To send a data packet in response, the optimization device C 510 may first transmit the response to the optimization device B 506 via path 514. Acting in tandem, the optimization device B 506 overwrites the header data in a data packet received from the optimization device C 510 to replace the identification of the optimization device C 510 with the identification of the optimization device B 506. The optimization device B 506 then transmits the data packet with the altered header to the optimization device A 502.

In various embodiments, the data packet may be enhanced by optimization device A 502 and transmitted to optimization device C 510 which accesses the enhanced data packet (as discussed in FIG. 5A). In other embodiments, the data packet may be enhanced by optimization device A 502 and transmitted through optimization device B 506 to the optimization device C 510. The optimization device B 506 may receive the enhanced data packet, access the payload of the enhanced data packet (e.g., decrypt the data), and enhance the payload again (e.g., re-encrypt the data) before sending the data packet to the optimization device C 510. In yet other embodiments, the optimization device B 506 may simply reroute packets between the optimization device A 502 and the optimization device C 510 without altering the data packet.

Figure 6:
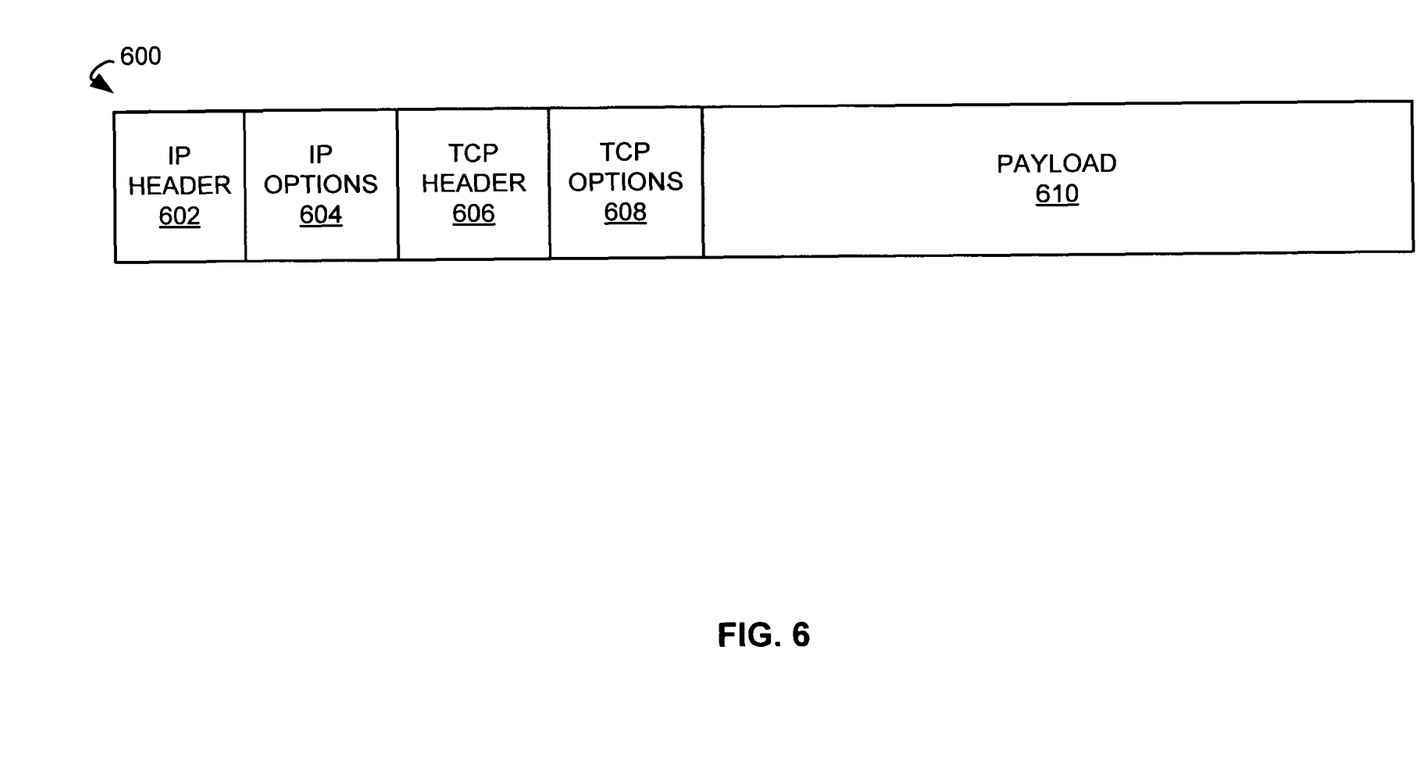
FIG. 6 depicts a block diagram of a Transmission Control Protocol/Internet Protocol data packet according to various embodiments.

FIG. 6 depicts a block diagram of a Transmission Control Protocol/Internet Protocol (TCP/IP) data packet 600 according to various embodiments. The TCP/IP data packet 600 comprises an IP header 602, IP options 604, a TCP header 606, TCP options 608, and a payload 610. An optimization device 102 can modify the data packet at layers 3 and 4 of the TCP/IP protocols. According to the TCP/IP protocols, a modification may be made within the IP header 602, the IP options 604, the TCP header 606, and/or the TCP options 608. For example, an unused TCP option or an unused IP option may be selected to indicate that an optimization device is capable of enhanced payload processing. In some embodiments, the modification may include at least a portion of the IP address of the optimization device making the modification.

Figure 7:
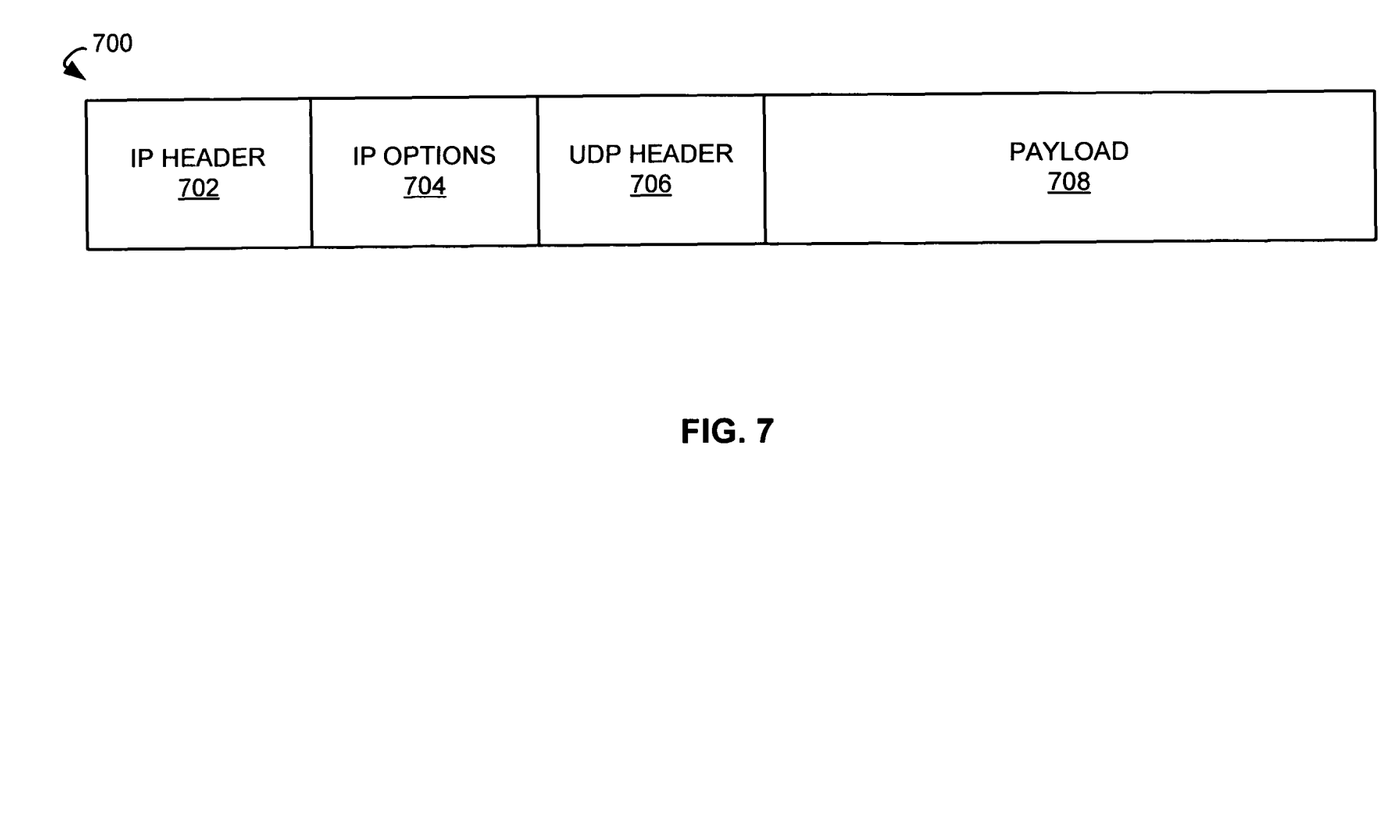
FIG. 7 depicts a block diagram of an Internet Protocol/User Datagram Protocol data packet according to various embodiments.

FIG. 7 depicts a block diagram of an Internet Protocol/User Datagram Protocol (IP/UDP) data packet 700 according to various embodiments. The IP/UDP data packet 700 comprises an IP header 702, IP options 704, a UDP header 706, and a payload 708. In these embodiments, a modification may be included in the IP header 702, or the IP options 704.

Figure 8:
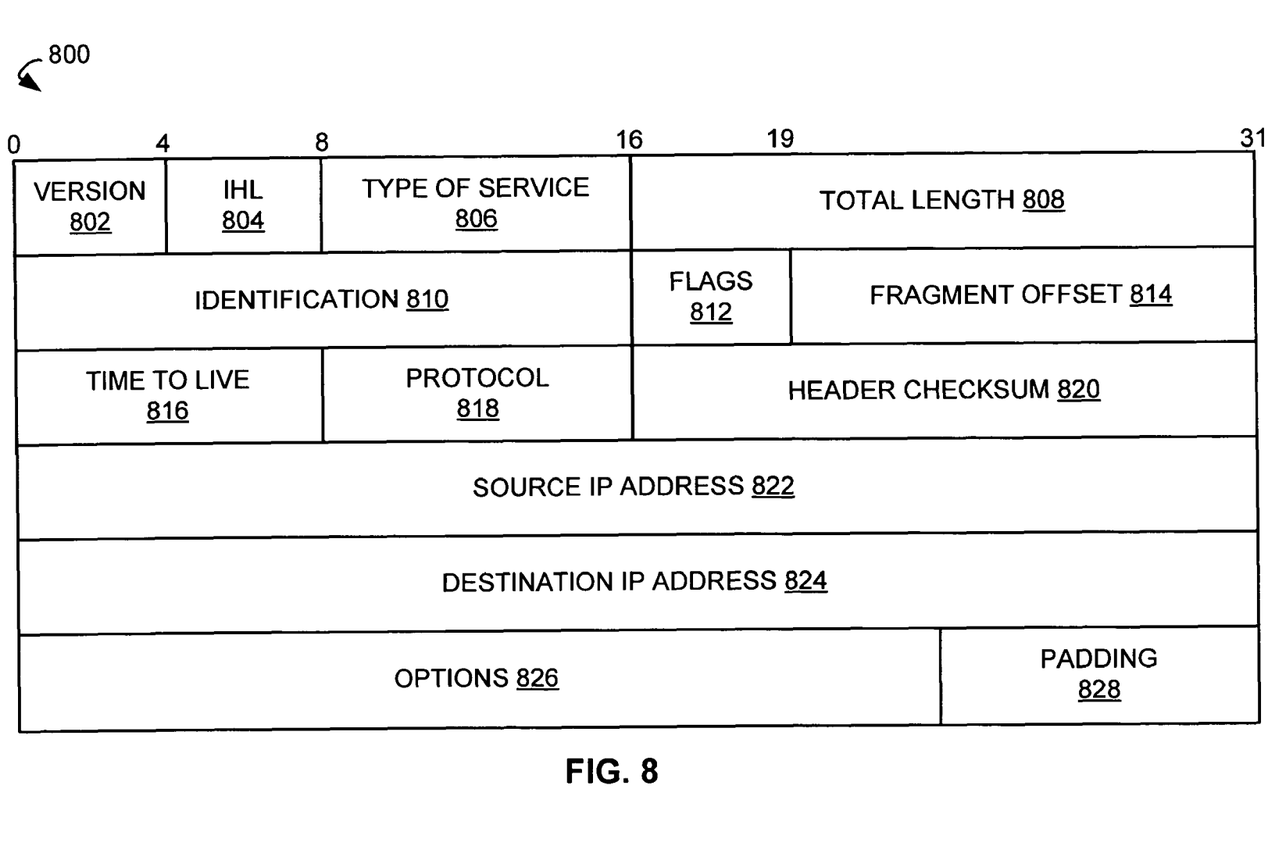
FIG. 8 depicts a block diagram of an Internet Protocol header according to various embodiments.

FIG. 8 depicts a block diagram of an IP header 800 according to various embodiments. Typically, the IP header comprises a version field 802, an IP header length (IHL) field 804, a type of service field 806, a total length field 808, an identification field 810, a flags field 812, a fragment offset field 814, a time to live field 816, a protocol field 818, a header checksum 820, a source IP address 822, a destination IP address 824, options 826, and padding 828. A modification may be made in at least one of these fields.

The identification field 810 comprises a 16-bit number that together with the source IP address field 822 uniquely identifies the data packet. The identification field 810 may be used during reassembly of fragments of the data packet. The identification field 810 is unique for each packet within a given data flow and is typically based on an incrementing counter.

The modification is included in the identification field 810 while ensuring that the identification field 810 is unique. A first method of modifying the identification field 810 is to increment a first portion of the bits while the remaining bits include the modification. For example, in some embodiments, the higher eight bits may be based on an incrementing counter. The lower eight bits may then be used to convey the modification. The lower eight bits may be modified to include, for example, a portion of the IP address of the optimization device modifying the identification field 810 (e.g., optimization device 102).

In other embodiments, a larger portion of the IP address of the optimization device modifying the identification field 810 may be included in the identification field 810. In one example, a sixteen bit portion of the IP address may be included in the modification. To generate a unique value for the identification field 810, a hash function is performed on the payload of the data packet. The hash function may include a checksum. The hash value generated by the hash function is added to the sixteen bits of the IP address of the optimization device modifying the identification field 810.

If another optimization device (e.g., optimization device 104) receives the modified data packet, the other optimization device may perform the hash function on the payload of the modified data packet. The other optimization device then subtracts the resulting hash value from the identification field 810. The sixteen bits of the IP address that modified the data packet can then be identified as a modification.

Because only a portion of the thirty-two bit IP address may be included in the sixteen bit identification field 810, the complete IP address may be communicated over a series of two, four, eight, or more data packets. In these embodiments, the other optimization device is configured to reassemble the IP address so as to send an indication to the optimization device making the modification.

As will be apparent to those skilled in the art, other modifications may be used. For example, the IP address of the modifying optimization device may not be used. Instead, another identifier may be used such as a bit sequence that can be identified by the receiving optimization device as indicating a capability of enhanced payload processing.

A modification may be implemented in the identification field by using a portion of the bits to indicate a capability to process an enhanced payload. The modification may comprise, for example, two, four, six, eight, ten, twelve, or fourteen bits of the IP address of the optimization device 102. The IP address of the optimization device may thus be communicated over a series of modified data packets. The modification may alternatively be included in the IP options 826 as will be apparent to those skilled in the art.

Figure 9:
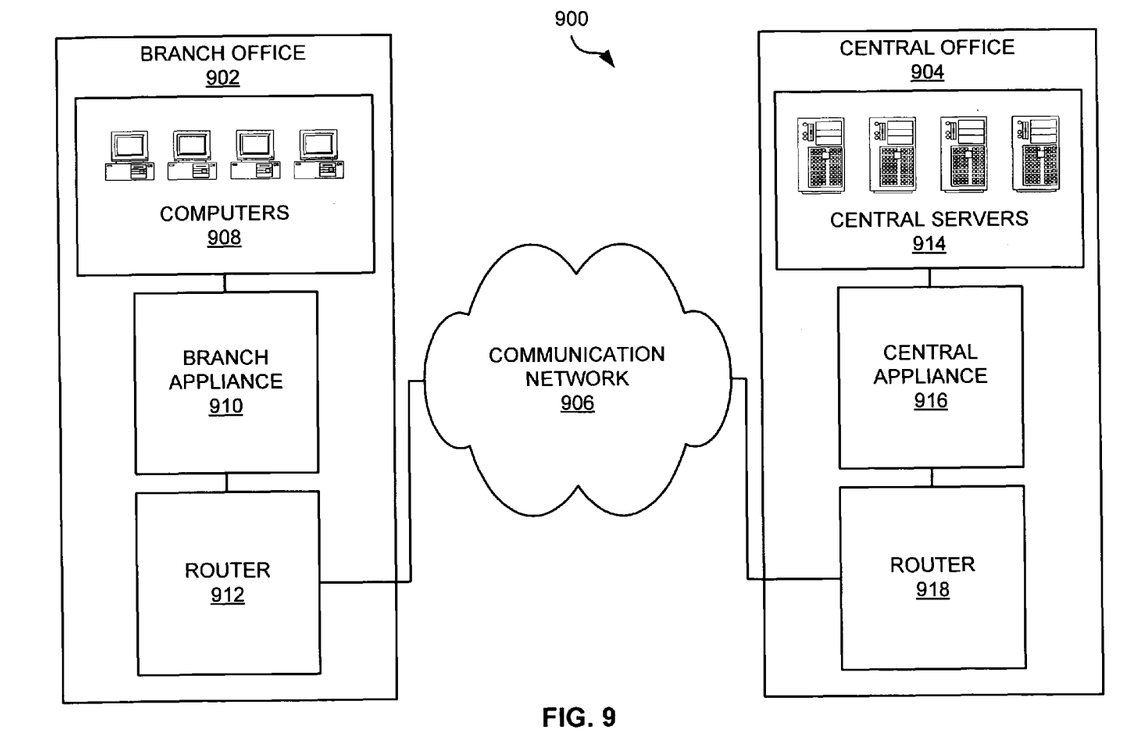
FIG. 9 depicts a block diagram of an exemplary network memory architecture according to various embodiments.

FIG. 9 depicts a block diagram of an exemplary network memory system 900 according to various embodiments. The network memory system 900 includes a branch office 902, a central office 904, and a communication network 906. The branch office 902 includes computers 908, a branch appliance 910, and a router 912. The branch appliance 910 may be a network device and/or comprise an optimization device. The central office 904 includes central servers 914, a central appliance 916, and a router 918. The central appliance 910 may be a network device and/or comprise an optimization device 102.

In the branch office 902, the computers 908 are linked to the branch appliance 910. The branch appliance 910 is linked to the router 912. The router 912 is coupled to the communication network 906. In the central office 904, the central servers 914 are linked to the central appliance 916. The central appliance 916 is linked to the router 918. The router 918 is coupled to the communication network 906.

For the sake of simplicity, FIG. 9 illustrates the network memory system 900 having a single branch office 902 and a single central office 904, and the respective communication between the branch office 902 and the central office 904. The principles discussed herein are equally applicable to multiple branch offices 902 (not shown) and to multiple central offices 904 (not shown) which are similarly coupled to the communication network 906. Branch office/branch office communication and central office/central office communication, as well as multi-appliance and/or multi-node communication and bi-directional communication are further within the scope of the disclosure.

The communication network 906 comprises hardware and/or software elements that enable the exchange of information (e.g., voice and data) between the branch office 902 and the central office 904. Possible implementations of the communication network 906 include a private wide-area network (WAN), and the Internet. Typical connections from the branch office 902 to the communication network 906 (e.g., from the router 912 and the router 918) may include ISDN, T1 lines (1.544 Mbps), and broadband connections such as digital subscriber lines (DSL) and cable modems. Other examples include T3 lines (43.232 Mbps), OC3 (155 Mbps), and OC48 (2.5 Gbps), although these are more costly and more likely to be used for interconnection at the central office 904 or as the backbone of the communication network 906.

The branch appliance 910 comprises hardware and/or software elements configured to receive data (e.g., email, files, and databases transactions), determine whether a portion of the data is locally accessible to another appliance (e.g., the central appliance 916), generate an instruction based on the determination, and transfer the instruction to the other appliance. The branch appliance 910 also comprises hardware and/or software elements configured to receive an instruction from another appliance (e.g., the central appliance 916), process the instruction to obtain data, and transfer the data to a computer (e.g., the computers 908). The branch appliance 910 may comprise the optimization device 102.

Locally accessible data comprises any data transferable to the computer (e.g., the computers 908 and the central servers 914) by an appliance (e.g., the branch appliance 910 and the central appliance 916) without transferring the data over the communication network 906. In some examples, the locally accessible data is stored in random access memory (RAM) in the branch appliance 910, on a hard drive in the branch appliance 910, or both. In another example, the locally accessible data is accessible by the branch appliance 910 over a local communication network (such as a LAN), for example, in a network attached storage (NAS) device that is internal or external to the branch office 902, and/or in an optical or flash storage device.

The instruction to be received by the branch appliance 910 comprises any message or signal that indicates an action to perform with the data. An instruction may indicate to the branch appliance 910 to store the data, to retrieve the data, or to forward the data to, for example, the computers 908. The instruction may be explicit, or may be implicit and based upon instructions indicating to store or retrieve data. In some embodiments, the instruction may indicate an index within a database for storing and retrieving the data.

The central appliance 916 similarly comprises hardware and/or software elements configured to receive data to be sent to the computer 908, determine whether a portion of the data is locally accessible to the branch appliance 910, generate an instruction based on the determination, and transfer the instruction to the other appliance. The central appliance 916 also comprises hardware and/or software elements configured to receive an instruction from another appliance (e.g., the branch appliance 910), process the instruction to obtain the data, and transfer the data to a computer (e.g., the central servers 914). The central appliance 916 may comprise the optimization device 102.

As illustrated, the branch appliance 910 is located in-line between the computers 908 and the router 912. The central appliance 916 is also located between the central server 914 and the router 918. The branch appliance 910 and the central appliance 916 transparently intercept network traffic between the computers 908 and the central servers 914. For example, the central appliance 916 transparently intercepts data sent from the central servers 914 and addressed to the computers 908. The computers 908 and the central servers 914 advantageously require no additional configuration because the branch appliance 910 and the central appliance 916 operate transparently.

Alternatively, the branch appliance 910 and the central appliance 916 may be configured as an additional router or gateway. As a router, for example, the branch appliance 910 appears to the computers 908 as an extra hop before the router 912. In some embodiments, the branch appliance 910 and the central appliance 916 provide redundant routing or peer routing with the router 912 and the router 918.

Like the network device, the central appliance 916 accesses a record indicating data sent previously to the branch appliance 910 when generating instructions. For example, the central appliance 916 may locally store data sent to the branch appliance 910. If the data is to be transferred again from the central appliance 916 to the branch appliance 910, the central appliance 916 may determine that the data is locally accessible to the branch appliance 910 and generate an instruction to the branch appliance 910 to retrieve the data from its locally accessible memory. The central appliance 916 sends the instruction to the branch appliance 910 and the branch appliance 910 processes the instruction to obtain the data. Subsequently, if the branch appliance 910 is to transfer the same data to the central appliance 916, the branch appliance 910 may make a determination based on having received the data from the central appliance 916 originally. The branch appliance 910 determines that the data is therefore locally accessible to the central appliance 916 and generates an instruction to the central appliance 916 to retrieve the data and transmits it. The central appliance 916 then processes the instruction to obtain the data. Therefore, an appliance (e.g., the branch appliance 910 and the central appliance 916) in the network memory system 900 advantageously uses data transferred to and from the appliance to reduce network traffic with other appliances in the network memory system 900.

The above-described functions can be comprised of executable instructions that are stored on storage media. The executable instructions can be retrieved and executed by a processor. Some examples of executable instructions are software, program code, and firmware. Some examples of storage media are memory devices, tape, disks, integrated circuits, and servers. The executable instructions are operational when executed by the processor to direct the processor to operate in accord with the invention. Those skilled in the art are familiar with executable instructions, processor(s), and storage media.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A method comprising:
   receiving a first data packet including an unenhanced payload from a first network device;
   modifying a portion of the first data packet, the portion being outside the unenhanced payload of the first data packet, to indicate that a first optimization device is capable of enhanced communication;
   sending the modified first data packet from the first optimization device to an endpoint device;
   receiving an indication of a capability of enhanced payload processing;
   generating an enhanced payload of a second data packet addressed to the endpoint device based on the indication;
   sending the second data packet including the enhanced payload to the endpoint device;
   sending a third data packet from the first optimization device to an endpoint device, the third data packet having a modified portion outside of a payload;
   receiving an acknowledgement of the third data packet that does not indicate a capability of enhanced payload processing;
   receiving a fourth data packet with an unenhanced payload; and
   sending the fourth data packet to the endpoint device.

2. The method of claim 1, wherein receiving the indication comprises receiving a third data packet from a second optimization device over a tunnel.

3. The method of claim 1, wherein receiving the indication comprises receiving a third packet including another enhanced payload.

4. The method of claim 1, wherein the modified portion includes a checksum.

5. The method of claim 1, wherein the modified portion includes a hash value.

6. The method of claim 1, wherein the modified portion includes a sequence number.

7. The method of claim 1, wherein the modified portion is included in a Transmission Control Protocol option.

8. The method of claim 1, wherein the modified portion is included in an Internet Protocol option.

9. The method of claim 1, wherein the modified portion is included in an Internet Protocol header.

10. The method of claim 1, wherein the enhanced payload of the second data packet is compressed.

11. The method of claim 1, wherein the enhanced payload of the second data packet is encrypted.

12. The method of claim 1, wherein the enhanced payload of the second data packet comprises a retrieval instruction.

13. The method of claim 1, further comprising:
    sending the first data packet from the first optimization device to the endpoint device via at least two optimization devices.

14. A method comprising:
    receiving a first data packet from an optimization device;
    analyzing a portion of the first data packet outside of a payload;
    identifying a modification;
    sending an indication of a capability to process an enhanced payload to the optimization device;
    receiving a second data packet from an optimization device;
    analyzing a portion of the second data packet outside of payload;
    identifying a modification; and
    sending an indication of an incapability to process an enhanced payload to the optimization device.

15. The method of claim 14, further comprising receiving a second data packet with an enhanced payload and processing the enhanced payload of the second data packet.

16. The method of claim 15, wherein processing the enhanced payload comprises decrypting the enhanced payload.

17. The method of claim 15, wherein processing the enhanced payload comprises decompressing the enhanced payload.

18. The method of claim 15, wherein processing the enhanced payload comprises executing a retrieval instruction.

19. The method of claim 15, wherein the portion includes an Internet Protocol header.

20. A system comprising:
    a first optimization device configured to receive a data packet from an endpoint device, modify a portion of the data packet outside of a payload to indicate that the first optimization device is capable of enhanced processing, and send the modified first data packet via a communication network;
    a second optimization device on the communication network, the second optimization device configured to receive the modified data packet, detect the modification, and indicate to the first optimization device that the second optimization device is capable of the enhanced processing;
    the first optimization device further configured to send a third data packet to an endpoint device, the third data packet having a modified portion outside of a payload;
    a third optimization device on the communication network configured to receive an acknowledgement of the third data packet that does not indicate a capability of enhanced payload processing; and a fourth optimization device on the communication network configured to receive a fourth data packet with an unenhanced payload and send the fourth data packet to the endpoint device.

21. The system of claim 20, wherein the first optimization device is further configured to receive a second data packet having a second payload from the endpoint device, enhance the second payload based on the indication, and send the second data packet with the enhanced payload to the second optimization device.

22. The system of claim 20, wherein a modification within the modified portion of the first data packet is not detected by another endpoint device configured to process the payload of the first data packet.

23. A system comprising:

a first modification module configured to receive a first data packet from a network device, modify a portion of the first data packet outside of a payload of the first data packet, the modification indicating an enhanced processing capability;

an first identification module configured to receive a second modified data packet from an optimization device, detect the modification in a portion of the second data packet, and send an indication of the enhanced processing capability to the optimization device;

a second modification module further configured to send a third data packet to an endpoint device, the third data packet having a modified portion outside of a payload; and a second identification module configured to receive an acknowledgement of the third data packet that does not indicate a capability of enhanced payload processing, receive a fourth data packet with an unenhanced payload, and send the fourth data packet to the endpoint device.

* * * * *